United States Patent

Creasey et al.

[11] 4,042,643
[45] Aug. 16, 1977

[54] ORGANOPOLYSILOXANE COMPOSITIONS

[75] Inventors: Norman Geoffrey Creasey; Leslie Clark Pike, both of Manchester, England

[73] Assignee: Imperial Chemical Industries Limited, England

[21] Appl. No.: 628,764

[22] Filed: Nov. 4, 1975

[30] Foreign Application Priority Data

Nov. 15, 1974 United Kingdom ............... 49485/74
June 27, 1975 United Kingdom ............... 27290/75

[51] Int. Cl.² .................. B32B 9/04; C08L 83/04
[52] U.S. Cl. .................... 428/447; 260/825; 260/45.65 UA; 427/207 R; 427/387; 427/391; 428/429; 428/452; 528/503
[58] Field of Search .................. 260/825; 428/447; 427/207

[56] References Cited

U.S. PATENT DOCUMENTS

| | | | |
|---|---|---|---|
| 3,046,160 | 7/1962 | Dengler | 117/155 |
| 3,300,542 | 1/1967 | Hadlock | 260/825 |
| 3,308,080 | 3/1967 | Haenni | 260/29.1 |
| 3,419,514 | 12/1968 | Hadlock | 260/33.4 |
| 3,518,325 | 6/1970 | Campbell | 260/825 |
| 3,522,202 | 7/1970 | Wada | 260/33.2 |
| 3,527,659 | 9/1970 | Keil | 117/145 |
| 3,527,728 | 9/1970 | Gibbon | 260/825 |
| 3,532,766 | 10/1970 | Leyshon | 260/825 |
| 3,624,017 | 11/1971 | Sorkin | 260/29.2 M |
| 3,817,745 | 6/1974 | Plante | 260/825 |
| 3,846,506 | 11/1974 | Gibbon | 260/825 |
| 3,922,443 | 11/1975 | Brown | 428/447 |
| 3,941,856 | 3/1976 | Creasey | 260/825 |

FOREIGN PATENT DOCUMENTS 1,152,251 5/1969 United Kingdom
1,240,520 7/1971 United Kingdom

*Primary Examiner*—Paul Lieberman
*Attorney, Agent, or Firm*—Cushman, Darby & Cushman

[57] ABSTRACT

Diorganopolysiloxane release compositions, the release properties of which are modified by the incorporation of a copolymer of average general formula

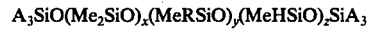

$A_3SiO(Me_2SiO)_x(MeRSiO)_y(MeHSiO)_zSiA_3$ where A and R are selected from specified groups $x$ and $z$ are numbers from 0–950, $y$ is a number from 1 to 1000, $x + y + z$ is not less than 20 and not greater than 1000, $y/(x+y+z)$ is not less than 0.05 and the total ratio of R:Si in the composition is not less than 1:2000.

13 Claims, No Drawings

ORGANOPOLYSILOXANE COMPOSITIONS

This invention relates to organopolysiloxane compositions suitable for conferring release properties on substrates and to a process of rendering substrates adhesive.

The use of organopolysiloxanes for conferring release properties on substrates is well known and widely practised. Among suitable well known compositions commonly used are those based on a diorganopolysiloxane capable of being cured to an elastomer in conjunction with one or more cross-linking agents and a curing catalyst. These compositions are very useful for conferring release properties on a wide variety of substrates including various kinds of paper, wood, metal, ceramics and plastics films. While satisfactory for many purposes it has, however, been found that they do not give a sufficiently low release when used with aggressive adhesives, i.e., adhesives having an adhesion greater than 1000g. per inch. We have now found, surprisingly, that the release properties conferred by such compositions can be improved by the incorporation therein of a proportion of certain copolymers.

According to the present invention compositions suitable for conferring release properties on substrates comprise 100 parts by weight of a polydiorganosiloxane, in the form of a curable release composition as hereinafter defined and 0.1 to 50 parts by weight of a copolymer essentially of the average general formula:

$$A_3SiO(Me_2SiO)_x(MeRSiO)_y(MeHSiO)_zSiA_3$$

where R is selected from (a) alkyl groups having at least four carbon atoms, alkaryl, aralkyl and cycloalkyl groups; (b) groups —$R^1$—$QR^2$ where $R^1$ is a divalent group containing at least two carbon atoms and joined to silicon by a C—Si linkage, $R^2$ is a monovalent hydrocarbon group and Q is either oxygen or sulphur; and (c) hydrocarbonoxy groups having at least four carbon atoms and joined to silicon by a C—Si linkage, A is selected from the groups R, lower alkyl groups, phenyl groups, alkenyl groups, alkoxy groups, hydroxy groups and hydrogen, x and z, which will not normally be the same, are 0 or a number not greater than 950, y is a number from 1 to 1000, x + y + z is not less than 20 and not greater than 1000, y/(x+y+z) is not less than 0.05 and the total ratio of R:Si in the composition is not less than 1:2000.

By the phrase "a curable organopolysiloxane release composition" as used herein, we mean a composition consisting essentially of a linear diorganopolysiloxane capable of being cured to an elastomer and such cross-linking and/or curing agent as may be necessary. Curable organopolysiloxane release compositions suitable for use in the compositions of our invention are well known and are of several types. These may be based on a linear polysiloxane containing silicon-bonded hydroxyl groups in which case a cross-linking agent such as a polysiloxane containing silicon-bonded hydrogen, an alkyl polysilicate, a trialkoxyorganosilane or partial hydrolysate thereof, or an organotriacyloxysilane is used together with a catalyst which may be, for example, one of the many well known tin compounds available and used for such purposes. Alternatively they may be based on a linear polysiloxane containing silicon-bonded vinyl groups with a cross-linking agent such as a polysiloxane containing silicon-bonded hydrogen and a catalyst such as a platinum compound or without any cross-linking agent but with a peroxide type catalyst.

These compositions may, of course, also contain known additives added to give modification of properties, for example, such as improving abrasion resistance or increasing the speed of cure. Curable release compositions of these types are described in, for example, British Patent Specifications Nos. 804,198, 848,312, 852,717, 1,111,156, 1,116,989, 1,152,251 and 1,240,520 and U.S. Pat. No. 2,940,875.

Suitable groups A include the groups R, methyl, ethyl and propyl groups, alkenyl groups such as vinyl and allyl groups, alkoxy groups such as methoxy, ethoxy and propoxy groups, hydroxy groups and hydrogen. Because of cost and ease of preparation, methyl and vinyl groups and hydrogen are normally preferred giving terminal groups on the copolymer such as $SiMe_3$, $SiMe_2H$ and $SiMe_2Vi$.

In the copolymer the group R may be, for example, a butyl, octyl, decyl, tetradecyl, octadecyl, cyclohexyl, phenylethyl, γ-phenoxypropyl, γ-octoxypropyl, β-hexadecoxyethyl, γ-poly(isopropoxy)propyl, β-carbomethoxypropyl or β-carbononoxypropyl group. In general, however, it is preferred that the group R contains from 6 to 30 carbon atoms and it is further preferred that it be an alkyl group and contains at least 8 carbon atoms.

It is also preferred that x + y + z be at least 40 and that y/(x + y + z) be from 0.1 to 0.9.

The copolymers may be prepared in known manner, for example, be reaction of a suitable polysiloxane containing silicon-bonded hydrogen atoms which a suitable olefinic compound in presence of a platinum catalyst or by cohydrolysis of suitable chlorsilanes. While the copolymers are essentially of the general formula shown they may also contain small amounts of branching.

While the copolymer may be used in amount from 0.1 to 50 parts by weight per 100 parts by weight of the curable diorganopolysiloxane amounts from 0.5 to 15 parts by weight are normally adequate and are in many cases preferred. The improvement in release value obtained increases with increase of copolymer content to a maximum beyond which further increase of copolymer content gives no additional decrease in release value. The quantity of copolymer required to give any specific effect also increases with increase in the absorbency of the substrate being coated. Thus in the case of an absorbent substrate such as a clay coated paper it may well be desirable or necessary to employ 15 to 20 parts by weight of copolymer per 100 parts by weight of curable diorganopolysiloxane. It is also in general preferred that the proportion of the copolymer used should be such that the ratio of R groups to total silicon atoms present in the composition should not be less than 1:1000.

In addition to the essential components our compositions may, of course, also contain other components commonly used in such release systems, for example, abrasion resistant additives, cure accelerators, bath stabilisers and the like.

The compositions of our invention are in general used without solvent or in solution in a solvent but may, if desired, be used in the form of aqueous dispersions or emulsions. If a solvent is used it may be any one of the commercially available inert solvents and is normally used in the amount required to give the desired viscosity of solution suitable for the particular manner of application to any substrate to be treated. Suitable solvents include aliphatic and aromatic hydrocarbons, chlorinated hydrocarbons, ethers, ketones and esters, for example, such as hexane, heptane, mineral spirits, toluene, xylene, trichlorethylene, perchlorethylene, tetrahydrofuran, methyl ethyl ketone and ethyl acetate.

The compositions of our invention may be cured in well known manner that chosen in any specific case being dependent on the nature of the release composition used. In general, compositions are preferred which cure in less than 2 minutes at a temperature of 70° to 200° C when in film form on a substrate. The temperature selected for curing in any specific case will, of course, be governed by the application for which the composition is being used.

Our compositions can be cured to non-migratory films having greatly improved release properties by applying to a substrate and thereafter exposing to a temperature of, for example, 150° C or higher for a few seconds or to a lower temperature for a longer period, for example, some 15 seconds at 120° C or about 1 minute at 70° C. The substrate to which the composition is applied may be any solid surface on which it is desired to confer release properties when used with aggressive adhesives. Suitable substrates include glass, stone and ceramics, plastics including polyolefin and polyester films and fabrics such as polypropylene and polyethylene terephthalate films and fabrics, cellulosic materials including films and fabrics such as wool, cotton and paper including glassine, parchment, kraft and tissue, and metals such as aluminum foil. The compositions are, however, particularly valuable for use in processes such as paper treating which can be carried out continuously at high speeds, for example, speeds of up to 500 ft/minute can be used where it is posssible to give a dwell time of some 15–30 seconds in a heating zone at 110°–120° C.

Our invention is further illustrated by the following examples in which all parts are by weight.

EXAMPLE 1

Two coating solutions were prepared, each consisting of 100 parts of a linear hydroxyl-ended dimethylpolysiloxane of viscosity $10^7$ cS at 25° C, 6 parts of a linear trimethylsilylended methylhydrogen polysiloxane of viscosity 20 cS at 25° C and of Me:Si ratio 1.08 to 1, 8 parts of dibutyltin diacetate and 1 part of acetic acid in 1,200 parts of toluene. To one of these solutions was added 5 parts of a copolymer (A) of average formula:

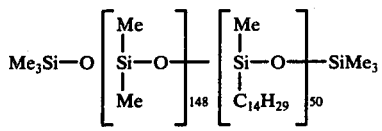

These solutions were then coated onto vegetable parchment paper to give silicone coatings of about 0.8 g/m² and the coatings cured in a forced draught air oven at 120° C for 20 seconds. They were then coated with a solvent solution of an aggressive pressure sensitive adhesive, again placed in an air oven to remove the adhesive solvent and finally label paper was applied to the solvent-free adhesive surface to complete the laminate. Samples of each laminate were stored under a pressure of ¼ psi for 20 hours at 20° C, then the force required to separate an inch wide strip at speeds of 12, 400, 800 and 1500 inches per minute was measured. The separated adhesive coated paper strips were applied to a clean polyethylene terephthalate film surface, rolled twelve times with a 30 lb roller, and the release force, called "subsequent adhesion", measured. The observed results are given below:

| COPOLYMER ADDED | Peel force (g/inch) at stripping speeds (inches/minute) | | | | Subsequent release (g/inch) |
|---|---|---|---|---|---|
| | 12 | 400 | 800 | 1500 | |
| — | 19 | 82 | 144 | 192 | 1450 |
| A | 15 | 46 | 86 | 123 | 1500 |

The adhesive used was an aggressive SBR adhesive having a normal peel strength of 1300–1500 g/inch.

EXAMPLE 2

Six coating solutions were prepared, each consisting of 100 parts of a linear hydroxyl-ended dimethylpolysiloxane of viscosity $10^7$ cS at 25° C, 6 parts of a linear trimethylsilylended methylhydrogen polysiloxane of viscosity 20 cS as 25° C and of Me:Si ratio 1.08 to 1, 7 parts of dibutyltin diacetate and 7 parts of an aminoalkoxypolysiloxane of average formula:

$$Me_3SiO[MeSi(OCH_2CH_2NH_2)O]_{50}SiMe_3$$

in 1200 parts of toluene. To five of these solutions were added amounts as shown below of copolymer (A). The solutions were then coated onto vegetable parchment paper, cured, laminated and tested as in Example 1. The resulted obtained are given below.

| Parts of copolymer A added | Peel force (g/inch) at stripping speeds (inches/minute) | | | | Subsequent release (g/inch) |
|---|---|---|---|---|---|
| | 12 | 400 | 800 | 1500 | |
| 0 | 49 | 109 | 172 | 206 | 1400 |
| 0.4 | 30 | 96 | 150 | 190 | 1500 |
| 1 | 21 | 83 | 145 | 170 | 1500 |
| 2.5 | 15 | 73 | 113 | 144 | 1400 |
| 10 | 9 | 56 | 91 | 126 | 1350 |
| 50 | 17 | 85 | 104 | 119 | 1450 |

(The adhesive used was an agressive SBR adhesive having a normal peel strength of 1300–1500 g/inch)

EXAMPLE 3

Two coating solutions were prepared each consisting of 100 parts of the hydroxyl-ended dimethylpolysiloxane used in Example 1, 6 parts of the methylhydrogen polysiloxane used in Example 1, 8 parts of 1,3-diacetyl-1,1,3,3-tetrabutyldistannoxane and 9 parts of an aminoalkoxypolysiloxane of average formula:

$$Me_3SiO[MeSi(OCH_2CH_2NMe_2)O]_{50}SiMe_3$$

in 1200 parts of an aliphatic solvent of boiling range 110° – 135° C. To one of these solutions was added 5 parts of copolymer (A). The solutions thus obtained were coated onto parchment paper, cured, laminated and tested as described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 34 | 104 | 177 | 231 |
| A | 11 | 53 | 95 | 144 |

EXAMPLE 4

Three coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (B) of average formula:

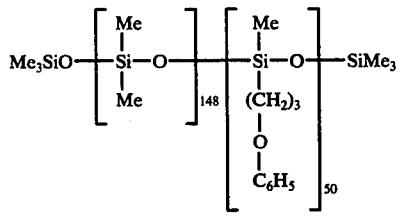

and to another was added 5 parts of a copolymer (C) of average formula:

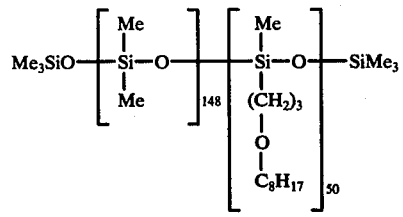

The solutions thus obtained were coated onto parchment paper, cured, laminated and tested as described in Example 1. The results obtained are given below:

| Copolymer added | Peel force (g/inch) at stripping speeds (inches/minutes) | | | |
|---|---|---|---|---|
| | 12 | 400 | 800 | 1500 |
| — | 30 | 101 | 145 | 182 |
| B | 13 | 64 | 128 | 157 |
| C | 11 | 63 | 104 | 159 |

EXAMPLE 5

Five coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (D) of average formula:

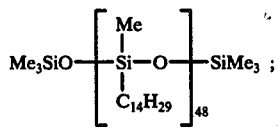

to another was added 5 parts of a copolymer (E) of average formula:

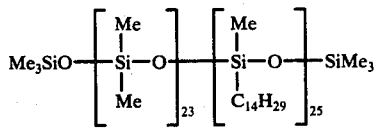

to another was added 5 parts of a copolymer (F) of average formula:

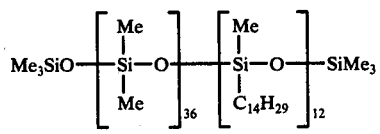

and to another was added 5 parts of a copolymer (G) of average formula:

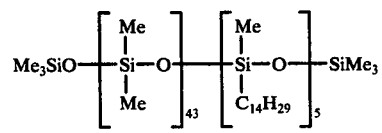

The solutions thus obtained were coated onto parchment paper, cured, laminated and tested as described in Example 1. The results obtained are given below:

| Copolymer added | Peel force (g/inch) at stripping speeds (inches/minutes) | | | |
|---|---|---|---|---|
| | 12 | 400 | 800 | 1500 |
| — | 45 | 99 | 163 | 193 |
| D | 31 | 89 | 130 | 191 |
| E | 10 | 60 | 96 | 122 |
| F | 19 | 69 | 114 | 146 |
| G | 14 | 66 | 135 | 182 |

EXAMPLE 6

Two coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (H) of average formula:

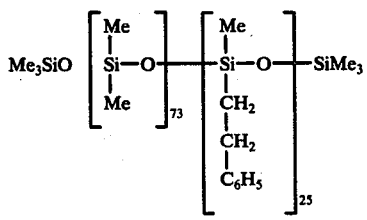

The solutions thus obtained were coated and tested as described in Example 1. The results obtained are given below

| Copolymer added | Peel force (g/inch) at stripping speeds (inches/minute) | | | |
|---|---|---|---|---|
| | 12 | 400 | 800 | 1500 |
| — | 35 | 95 | 170 | 218 |
| H | 12 | 51 | 89 | 135 |

EXAMPLE 7

Two coating solutions were prepared each consisting of 100 parts of the hydroxyl-ended dimethylpolysiloxane used in Example 1, 6 parts of the methylhydrogen polysiloxane used in Example 1, 8 parts of dibutyltin diacetate, 1 part of acetic acid and 0.5 part of an aminoalkoxypolysiloxane of average formula:

$Me_3SiO[MeSi(OCH_2CH_2NH_2)O]_7 [MeSi(OMe)O]_{43}.SiMe_3$ in 1200 parts of toluene.

To one of these solutions was added 5 parts of copolymer (A).

The solutions were then coated onto vegetable parchment paper to give silicone coatings of about 0.8g/sq.meter, and the coatings cured in a forced draught air oven at 120° C for 10 seconds. The cured silicone films were then coated with a solvent solution of the aggressive pressure sensitive adhesive used in Example 1. They were then dried, laminated, stored and tested as described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 31 | 87 | 170 | 234 |
| (A) | 11 | 55 | 100 | 160 |

EXAMPLE 8

Two coating solutions were prepared each consisting of 100 parts of the hydroxyl-ended dimethylpolysiloxane used in Example 1, 6 parts of the methylhydrogen polysiloxane used in Example 1, 1.1 parts of dibutyltin di(2-ethylhexoate), 0.8 part of tetra(2-methoxyethoxy)-silane and 5 parts of methyl ethyl ketone in 1200 parts of toluene. To one of these solutions was added 5 parts of the copolymer (A). The solutions thus obtained were coated and tested as described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 19 | 89 | 175 | 277 |
| A | 10 | 53 | 106 | 136 |

EXAMPLE 9

Two coating solutions were prepared each consisting of 100 parts of the hydroxyl-ended dimethylpolysiloxane in Example 1, 6 parts of the methylhydrogen polysiloxane used in Example 1, 1.1 parts of 1,3-diacetyl-1,1,3,3-tetrabutyldistannoxane, 0.8 part of tetra (2-methoxyethoxy) silane and 5 parts of methyl ethyl ketone in 1200 parts of toluene. To one of these solutions was added 5 parts of copolymer (A). The solutions thus obtained were coated and tested as described in Example 1. The results obtained are given below:

| Copolymer added | Peel force (g/inch) at stripping speeds (inches/min) | | | |
|---|---|---|---|---|
| | 12 | 400 | 800 | 1500 |
| — | 17 | 146 | 280 | 367 |
| A | 10 | 60 | 115 | 141 |

EXAMPLE 10

Eight coating solutions were prepared each consisting of 100 parts of the hydroxyl-ended dimethylpolysiloxane used in Example 1, various parts, as described below, of the methylhydrogen polysiloxane used in Example 1, 7 parts of dibutyltin diacetate and 7 parts of the aminoalkoxypolysiloxane used in Example 2 in 1200 parts of toluene. To four of these solutions were added 5 parts of copolymer (H). The solutions thus obtained were coated and tested as described in Example 1. The results obtained are given below:

| Copolymer added | Part of MeH polysiloxane | Peel force (g/inch) at stripping speeds (inches/minute) | | | |
|---|---|---|---|---|---|
| | | 12 | 400 | 800 | 1500 |
| — | 2 | 252 | 235 | 290 | 302 |
| H | 2 | 161 | 202 | 245 | 305 |
| — | 6 | 27 | 99 | 127 | 152 |
| H | 6 | 17 | 64 | 102 | 142 |
| — | 12 | 19 | 64 | 96 | 127 |
| H | 12 | 11 | 52 | 85 | 117 |
| — | 20 | 17 | 68 | 96 | 144 |
| H | 20 | 13 | 54 | 85 | 114 |

EXAMPLE 11

Two coating solutions were prepared each consisting of 100 parts of the hydroxyl-ended dimethylpolysiloxane used in Example 1, 12 parts of a methylhydrogenpolysiloxane of average formula $Me_3SiO(Me_2SiO)_{23}(MeHSiO)_{25}SiMe_3$, 7 parts of dibutyltin diacetate and 7 parts of the aminoalkoxypolysiloxane used in Example 2 in 1200 parts of toluene. To one of these solutions was added 5 parts of copolymer (E). The solutions thus obtained were coated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 19 | 82 | 115 | 150 |
| E | 11 | 53 | 84 | 115 |

EXAMPLE 12

Four coating solutions were prepared each consisting of 100 parts of a hydroxyl-ended dimethylpolysiloxane of viscosity as indicated below, 6 parts of the methylhydrogenpolysiloxane used in Example 1, 8 parts of dibutyltin diacetate, 1 part of acetic acid and 0.5 part of the aminoalkoxypolysiloxane used in Example 7 in amounts of toluene as shown. To two of these solutions were added 5 parts of the copolymer (C). The solutions thus obtained were coated, cured, laminated and tested as described in Example 7. The results obtained are given below:

| Copolymer added | Hydroxyl-ended dimethylpolysiloxane viscosity (cP) at 25° C | Parts toluene per 100 parts dimethyl-polysiloxane | Peel force (g/inch) at stripping speeds (inches/minute) | | |
|---|---|---|---|---|---|
| — | 96,800 | 400 | 25 | 131 | 181 | 215 |
| C | 96,800 | 400 | 6 | 54 | 90 | 142 |
| — | 2,520 | 200 | 35 | 110 | 136 | 167 |
| C | 2,520 | 200 | 11 | 59 | 80 | 97 |

EXAMPLE 13

For coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (I) of average formula:

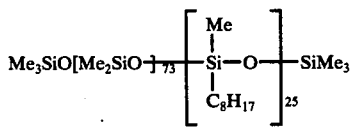

to another was added 5 parts of copolymer (J) of average formula:

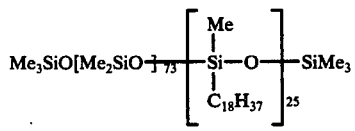

to another was added 5 parts of copolymer (K) of average formula:

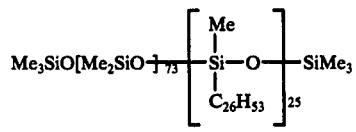

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 39 | 96 | 143 | 186 |
| I | 12 | 47 | 76 | 113 |
| J | 12 | 51 | 90 | 112 |
| K | 37 | 78 | 117 | 156 |

EXAMPLE 14

Three coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (L) of average formula:

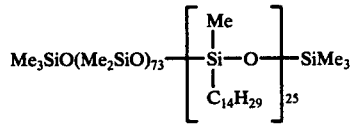

to another was added 5 parts of a copolymer (M) of average formula:

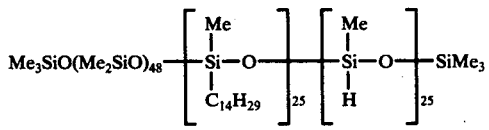

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 29 | 114 | 141 | 197 |
| L | 8 | 54 | 76 | 135 |
| M | 9 | 56 | 92 | 144 |

EXAMPLE 15

Two coating solutions were prepared each consisting of 100 parts of the hydroxyl-ended dimethylpolysiloxane used in Example 1, 6 parts of the methylhydrogenpolysiloxane use in Example 1, 7 parts of dibutyltin diacetate and 7 parts of the aminoalkoxypolysiloxane used in Example 2 in 1200 parts of toluene.

To one of these solutions was added 5 parts of copolymer (N) of average formula:

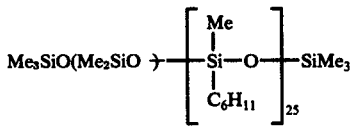

$C_6H_{11}$ is the cyclohexyl group

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 25 | 80 | 143 | 180 |
| N | 18 | 72 | 124 | 179 |

EXAMPLE 16

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (P) of average formula:

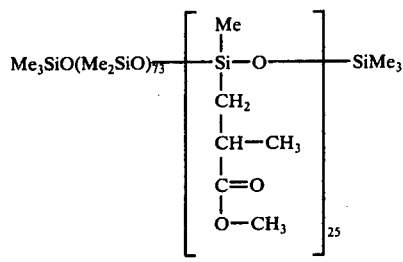

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 26 | 99 | 134 | 180 |
| P | 16 | 85 | 122 | 174 |

EXAMPLE 17

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of 3-aminopropyltriethoxysilane in 1200 parts of toluene.

To one of these solutions was added 5 parts of copolymer (I). The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 79 | 145 | 184 | 270 |
| I | 16 | 67 | 111 | 167 |

EXAMPLE 18

Two coating solutions were prepared each consisting of 100 parts of the hydroxyl-ended dimethylpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (F). The solutions thus obtained were coated on to parchment paper, cured, laminated and tested in the manner described in Example 1. The results obtained are given below:

| Copolymer added | Peel force (g/inch) at stripping speeds (inches/minute) | | |
|---|---|---|---|
| | 12 | 400 | 800 |
| — | 132 | 215 | 400 |
| F | 55 | 162 | 217 |

EXAMPLE 19

Two coating solutions were prepared each consisting of 100 parts of the hydroxyl-ended dimethylpolysiloxane used in Example 1, 6 parts of the methylhydrogenpolysiloxane used in Example 1, 3 parts of tetrabutyl bis(butyraldoximo)distannoxane, 3.6 parts of acetic acid and 0.6 part of tetra(2-methoxyethoxy)silane in 1200 parts of toluene.

To one of these solutions was added 5 parts of copolymer (A). The solutions thus obtained were coated, cured, laminated end tested in the manner described in Example 7. The results obtained are given below:

| Copolymer added | Peel force (g/inch) at stripping speeds (inches/minute) | | |
|---|---|---|---|
| | 12 | 400 | 800 |
| — | 16 | 82 | 190 |
| A | 11 | 66 | 134 |

EXAMPLE 20

Two coating solutions were prepared each consisting of 100 parts of the hydroxyl-ended dimethylpolysiloxane used in Example 1, 6 parts of the methylhydrogenpolysiloxane used in Example 1, 3 parts of dibutyl bis(benzaldoximo)stannane, 3.6 parts of acetic acid and 0.6 part of tetra(2-methoxyethoxy)silane in 1200 parts of toluene.

To one of these solutions was added 5 parts of copolymer (J). The solutions thus obtained were coated, cured, laminated and tested in the manner described in Example 7. The results obtained are given below:

| Copolymer added | Peel force (g/inch) at stripping speeds (inches/minute) | | | |
|---|---|---|---|---|
| | 12 | 400 | 800 | 1500 |
| — | 16 | 70 | 136 | 225 |
| J | 9 | 58 | 77 | 152 |

EXAMPLE 21

Two coating solutions were prepared each consisting of 100 parts of the hydroxyl-ended dimethylpolysiloxane used in Example 1, 6 parts of the methylhydrogenpolysiloxane used in Example 1, 1.1 parts of dibutyltin diethoxide, 0.8 part of tetra(2-methoxyethoxy)silane and 200 parts of methyl ethyl ketone in 1000 parts of toluene.

To one of these solutions was added 5 parts of copolymer (J). The solutions thus obtained were coated, cured, laminated and tested in the manner described in Example 7. The results obtained are given below:

| Copolymer added | Peel force (g/inch) at stripping speeds (inches/minute) | | | |
|---|---|---|---|---|
| | 12 | 400 | 800 | 1500 |
| — | 17 | 75 | 122 | 240 |
| J | 11 | 54 | 95 | 155 |

EXAMPLE 22

Two coating solutions were prepared each consisting of 80 parts of a linear trimethylsilyl-ended dimethylpolysiloxane of viscosity $2 \times 10^7$ cS at 25° C, 20 parts of the hydroxyl-ended dimethylpolysiloxane used in Example 1, 4 parts of the methylhydrogenpolysiloxane used in Example 1, 8 parts of dibutyltin diacetate, 1 part of acetic acid and 0.5 part of the aminoalkoxypolysiloxane used in Example 7 in 1200 parts of toluene.

To one of these solutions was added 5 parts of copolymer (A). The solutions thus obtained were coated, cured, laminated and tested in the manner described in Example 7. The results obtained are give below:

| Copolymer added | Peel force (g/inch) at stripping speeds (inches/minute) | | | |
|---|---|---|---|---|
| | 12 | 400 | 800 | 1500 |
| — | 17 | 61 | 111 | 166 |
| A | 9 | 52 | 91 | 137 |

EXAMPLE 23

Two coating solutions were prepared each consisting of 80 parts of a linear trimethylsilyl-ended methylvinylpolysiloxane containing 0.2 mole % vinyl groups and of viscosity $2 \times 10^7$ cS at 25° C, 20 parts of a linear trimethylsilyl-ended methylvinylpolysiloxane containing 3.5 mole % vinyl groups and of viscosity 600,000 cS at 25° C, 6 parts of the methylhydrogenpolysiloxane used in Example 1 and 0.05 part of bis(diethylsulphide)platinous chloride in 1200 parts of an aliphatic solvent of boiling range 70°–95° C.

To one of these solutions was added 5 parts of copolymer (A). The solutions were then coated on to vegetable parchment paper to give silicone coatings of about 0.8g/sq.meter, and the coatings cured in a forced draught air oven at 150° C for 20 seconds. The cured silicone films were then coated with a solvent solution of the aggressive pressure sensitive adhesive used in Example 1. They were then dried, laminated, stored and tested as described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 20 | 64 | 75 | 113 |
| A | 14 | 50 | 66 | 89 |

EXAMPLE 24

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (S) of average formula:

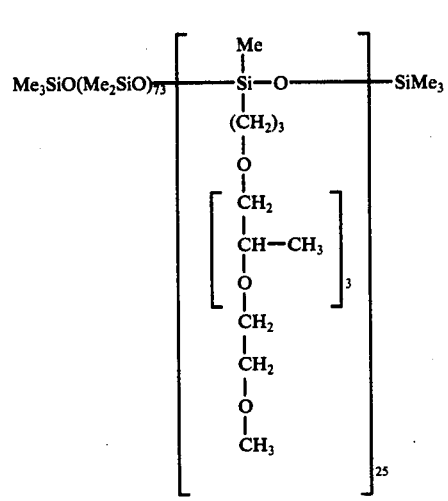

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 38 | 120 | 190 | 260 |
| S | 18 | 86 | 137 | 211 |

EXAMPLE 25

Two coating solutions were prepared and consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (T) of average formula:

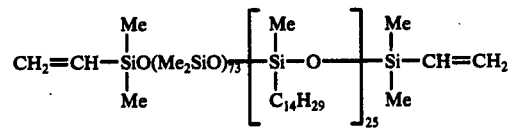

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 35 | 120 | 144 | 206 |
| T | 13 | 79 | 112 | 167 |

EXAMPLE 26

Two coating solutions were prepared each consisting of 100 parts of the hydroxy-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (U) of average formula:

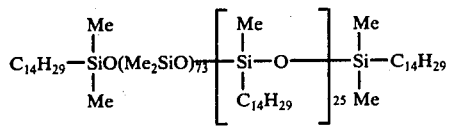

The solutions thus obtained were coated on to parchment paper, cured, laminated and tested in the manner described in Example 1. The results obtained are given below.

| Copolymer added | Peel force (g/inch) at stripping speeds (inches/minute) | | | |
|---|---|---|---|---|
| | 12 | 400 | 800 | 1500 |
| — | 35 | 120 | 144 | 206 |
| U | 12 | 80 | 122 | 139 |

EXAMPLE 27

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (V) of average formula:

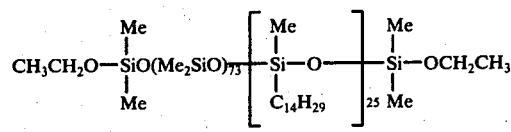

The solutions thus obtained were coated on to parchment paper, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 35 | 120 | 144 | 206 |
| V | 12 | 72 | 116 | 160 |

EXAMPLE 28

Two coating solutions were prepared each consisting of 100 parts of a linear hydroxyl-ended dimethylpolysiloxane of viscosity 70 cS as 25° C, 8 parts of the methylhydrogenpolysiloxane used in Example 1 and 0.03 part of bis(diethylsulphide) platinous chloride.

To one of these solutions was added 5 parts of copolymer (A). The solutions were then coated on to vegetable parchment paper and the coatings cured in a forced draught air oven at 120° C for 25 seconds. The cured silicone films were then coated with a solvent solution of the aggressive pressure sensitive adhesive used in Example 1. They were then dried, laminated, stored and tested as described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 5 | 23 | 29 | 35 |
| A | 3 | 12 | 22 | 25 |

EXAMPLE 29

Two coating solutions were prepared each consisting of 100 parts of a linear trimethylsily-ended methylvinylpolysiloxane containing 15 mole % vinyl groups and of viscosity 125 cS at 25° C. 8 Parts of the methylhydrogenpolysiloxane used in Example 1 and 0.03 parts of bis(diethylsulphide) platinous chloride.

To one of these solutions was added 5 parts of copolymer (A). The solutions thus obtained were coated, cured, laminated and tested in the manner described in Example 28. The results obtained are given below:

| Copolymer added | Peel force (g/inch) at stripping speeds (inches/minute) | | | |
|---|---|---|---|---|
| | 12 | 400 | 800 | 1500 |
| — | 7 | 30 | 33 | 42 |
| A | 3 | 13 | 18 | 23 |

We claim:

1. A composition suitable for conferring release properties on substrates comprising 100 parts by weight of a curable linear diorganopolysiloxane, a cross-linking agent therefore and/or a catalyst therefore and 0.1 to 50 parts by weight of a copolymer of the average general formula $$A_3SiO(Me_2SiO)_x(MeRSiO)_y(MeHSiO)_zSiA_3$$

where R is selected from (a) alkyl groups having at least four carbon atoms, alkaryl, aralkyl and cycloalkyl groups; (b) groups —R$^1$—QR$^2$ where R$^1$ is a divalent group containing at least two carbon atoms and joined to silicon by a C—Si linkage, R$^2$ is a monovalent hydrocarbon group and W is either oxygen or sulphur; and (c) hydrocarbonoxy groups having at least four carbon atoms and joined to silicon by a C—Si linkage, A is selected from the groups R, lower alkyl groups, phenyl groups, alkenyl groups, alkoxy groups, hydroxy groups and hydrogen, x and z, which will not normally be the same, are O or a number not greater than 950, y is a number from 1 to 1000, x + y + z is not less than 20 and not greater than 1000, y/(x + y + z) is not less than 0.05 and the total ratio of R:Si in the composition is not less than 1:2000.

2. A composition according to claim 1 wherein the curable diorganopolysiloxane contains silicon-bonded hydroxyl groups, the cross-linking agent is selected from the group consisting of polysiloxanes containing silicon-bonded hydrogen, alkyl polysilicates, trialkoxyorganosilanes and partial hydrolysates thereof and organotriacyloxysilanes and the catalyst is a tin compound.

3. A composition according to claim 1 wherein the curable diorganopolysiloxane contains silicon-bonded vinyl groups, the cross-linking agent is a polysiloxane containing silicon-bonded hydrogen and the catalyst is a platinum compound.

4. A composition according to claim 1 wherein the curable diorganopolysiloxane contains silicon-bonded vinyl groups and the catalyst is a peroxide catalyst.

5. A composition according to claim 1 wherein the group a is selected from the group consisting of methyl and vinyl groups and hydrogen.

6. A composition according to claim 1 wherein the group R contains from 6 to 30 carbon atoms.

7. A composition according to claim 6 wherein the group R is an alkyl groups an contains at least 8 carbon atoms.

8. A composition according to claim 1 wherein $x + y + z$ is at least 40 and $y/(x + y + z)$ is from 0.1 to 0.9.

9. A composition according to claim 1 wherein the copolymer is used in an amount from 0.5 to 15 parts by weight per 100 parts by weight of the curable diorganopolysiloxane.

10. A composition according to claim 1 wherein the ratio of R groups to total silicon atoms in the composition is not less than 1:1000.

11. A process of rendering a substrate adhesive comprising applying thereto a composition as claimed in claim 1 and thereafter curing the said composition by heating.

12. A process according to claim 11 wherein the substrate is paper.

13. Adhesive substrates whenever prepared by a process a claimed in claim 11.

* * * * *